(12) United States Patent
Ring et al.

(10) Patent No.: US 6,364,068 B1
(45) Date of Patent: Apr. 2, 2002

(54) BRAKE CYLINDER PISTON TRAVEL INDICATOR

(75) Inventors: Michael E. Ring, Crown Point, IN (US); Scott L. Natschke, Kankakee, IL (US)

(73) Assignee: Westinghouse Airbrake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/687,340

(22) Filed: Oct. 13, 2000

(51) Int. Cl.$^7$ ............................................. F16D 66/00
(52) U.S. Cl. ............................. 188/1.11 W; 188/219.1
(58) Field of Search .................. 188/1.11 R, 1.11 L, 188/1.11 W, 219.1

(56) References Cited

U.S. PATENT DOCUMENTS

| 3,511,543 | A | * | 5/1970 | Burnham | 188/1.11 W |
| 5,441,128 | A | * | 8/1995 | Hoyt | 188/1.11 W |
| 6,082,502 | A | * | 7/2000 | Hawryszkow | 188/1.11 W |

* cited by examiner

Primary Examiner—Matthew C. Graham
(74) Attorney, Agent, or Firm—James Ray & Associates

(57) ABSTRACT

A brake cylinder piston travel indicator for monitoring an amount of piston travel in a brake cylinder assembly in a railway braking system is provided. The railway braking system includes a brake beam and a brake cylinder piston within the brake cylinder assembly which is in engagement with an end of a brake cylinder force transfer lever. The brake cylinder piston travel indicator of the invention comprises a rod member which is rotatably secured to and extends substantially parallel with at least a portion of the brake beam. A member is provided which operationally interconnects the rod member with the cylinder force transfer lever and is capable of transferring a rotational force to the rod member. This rotational force is caused by activation of the piston in the brake cylinder assembly. At least one indicating device is provided which is engagable with a first end of the rod member and is capable of responding to the rotation of the rod member and indicating an amount of travel of the piston during activation thereof in the brake cylinder assembly.

20 Claims, 3 Drawing Sheets

US 6,364,068 B1

BRAKE CYLINDER PISTON TRAVEL INDICATOR

FIELD OF THE INVENTION

The present invention relates, in general, to a brake cylinder piston travel indicator and, more particularly, to a brake beam mounted brake cylinder piston travel indicator which is located in an easily viewable location for readily determining piston travel in truss-type railway vehicle brake assemblies.

BACKGROUND OF THE INVENTION

Freight trains typically undergo a pre-departure terminal test in which the air brake equipment of each car is inspected prior to the train being cleared to proceed from the train make-up yard. This inspection requires a trainman to "walk the train" visually checking each car s brake equipment. Prior art type truck mounted brake assemblies include a piston travel indicator attached to the brake cylinder assembly for monitoring piston travel to determine whether or not the brake equipment is functioning properly.

The currently used piston travel indicator comprises an indicating means, such as a flag, which moves along a measuring means. This measuring means has an acceptable operating range or zone marked thereon. The inspector views the location of the flag with respect to the acceptable operating range to determine whether or not the braking equipment is functioning properly. For example, if the flag is below the range, then such would indicate that the slack adjuster trigger needs to be adjusted. If, on the other hand, the flag is above the range, such could indicate that either the slack adjuster is out of capacity and the brake shoes are too worn, or the slack adjuster is not functioning properly and requires maintenance.

Due to the location of this piston travel indicator within the truck mounted brake assembly underneath the car, it is often difficult for the trainman to readily view the indicator and to make a proper determination as to the functioning of the braking equipment. It thus becomes burdensome to inspect the braking equipment of the train and consequently more time consuming to complete the terminal test.

OBJECTS OF THE INVENTION

It is an object of the present invention to provide a brake cylinder piston travel indicator which is located in a readily viewable location for determining the amount of travel of a fluid activated piston.

It is a further object of the invention to provide a brake cylinder piston travel indicator which may be readily viewed by train inspection personnel so that such personnel may make a proper determination regarding the functioning of the train s braking equipment.

It is another object of the invention to position this brake cylinder piston travel indicator in a location on each braking assembly and/or on one or both sides of the railway vehicle so that train inspection personnel may quickly perform a pre-departure terminal test.

It is yet another object of the invention to provide a brake cylinder piston travel indicator which may be mounted onto braking systems currently in use and is particularly applicable to truss-type brake assembly systems.

In addition to the objects and advantages listed above, various other objects and advantages of the invention will become more readily apparent to persons skilled in the relevant art from a reading of the detailed description section of this document. The other objects and advantages will become particularly apparent when the detailed description is considered along with the drawings and claims presented herein.

SUMMARY OF THE INVENTION

Briefly, and in accordance with the forgoing objects, the invention comprises a brake cylinder piston travel indicator for monitoring an amount of piston travel in a brake cylinder assembly in a railway braking system. The railway braking system includes a brake beam and a brake cylinder piston within the brake cylinder assembly which is in engagement with an end of a brake cylinder force transfer lever. The brake cylinder piston travel indicator of the invention comprises a rod member which is rotatably secured to and extends substantially parallel with at least a portion of the brake beam. A means is provided which associates or operationally interconnects the rod member with the cylinder force transfer lever and is capable of transferring a rotational force to the rod member. This rotational force is caused by activation of the piston in the brake cylinder assembly. At least one indicating means is provided which is engagable with a first end of the rod member and is capable of responding to the rotation of the rod member and indicating an amount of travel of the piston during activation thereof in the brake cylinder assembly.

DETAILED DESCRIPTION OF THE INVENTION

Figure 1:
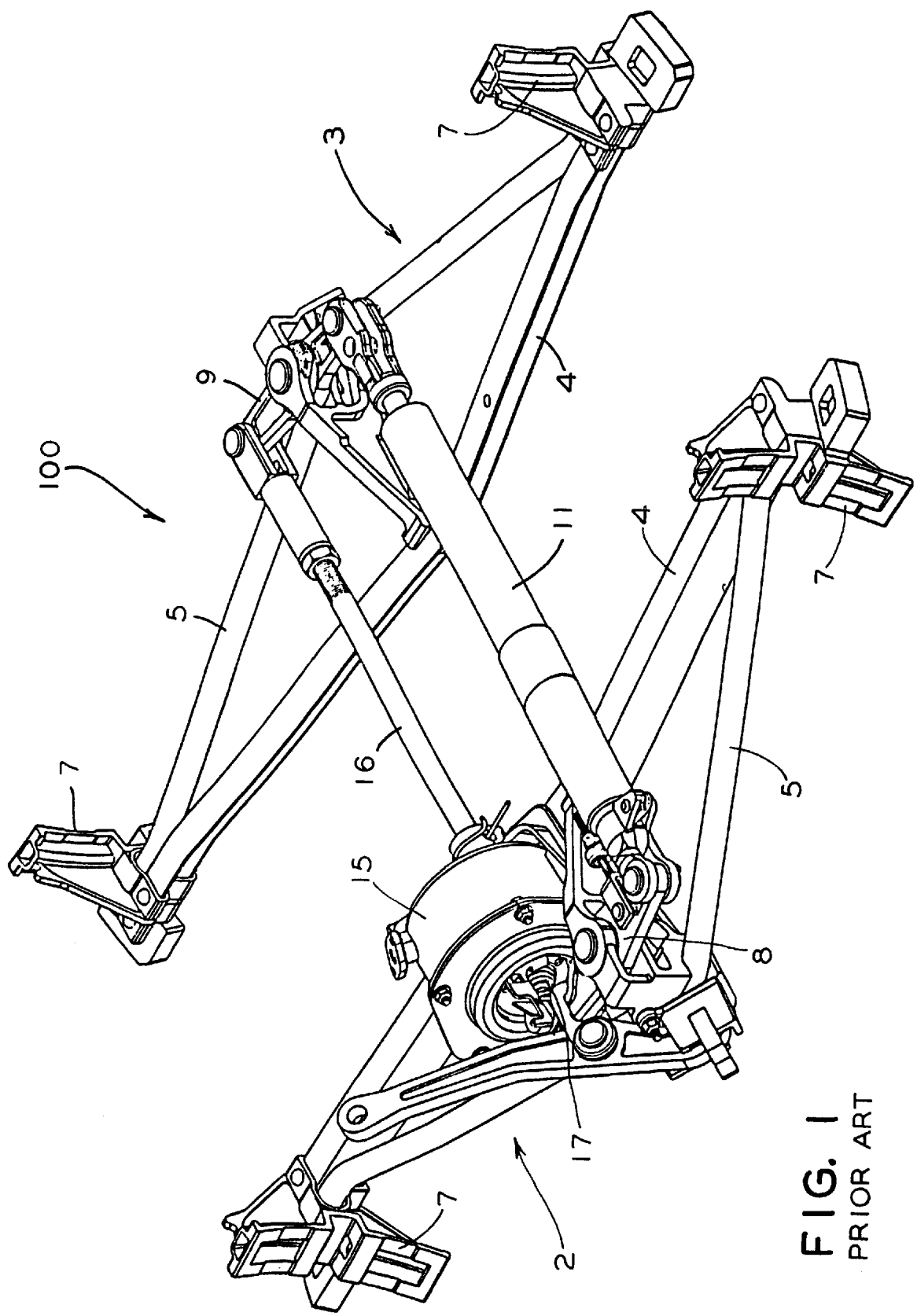
FIG. 1 shows a plan view of a truss-type brake assembly currently in use upon which the cylinder piston travel indicator can be mounted.

Before describing the invention in detail, the reader is advised that, for the sake of clarity and understanding, identical components having identical functions have been marked where possible with the same reference numerals in each of the Figures provided in this document.

Figure 2:
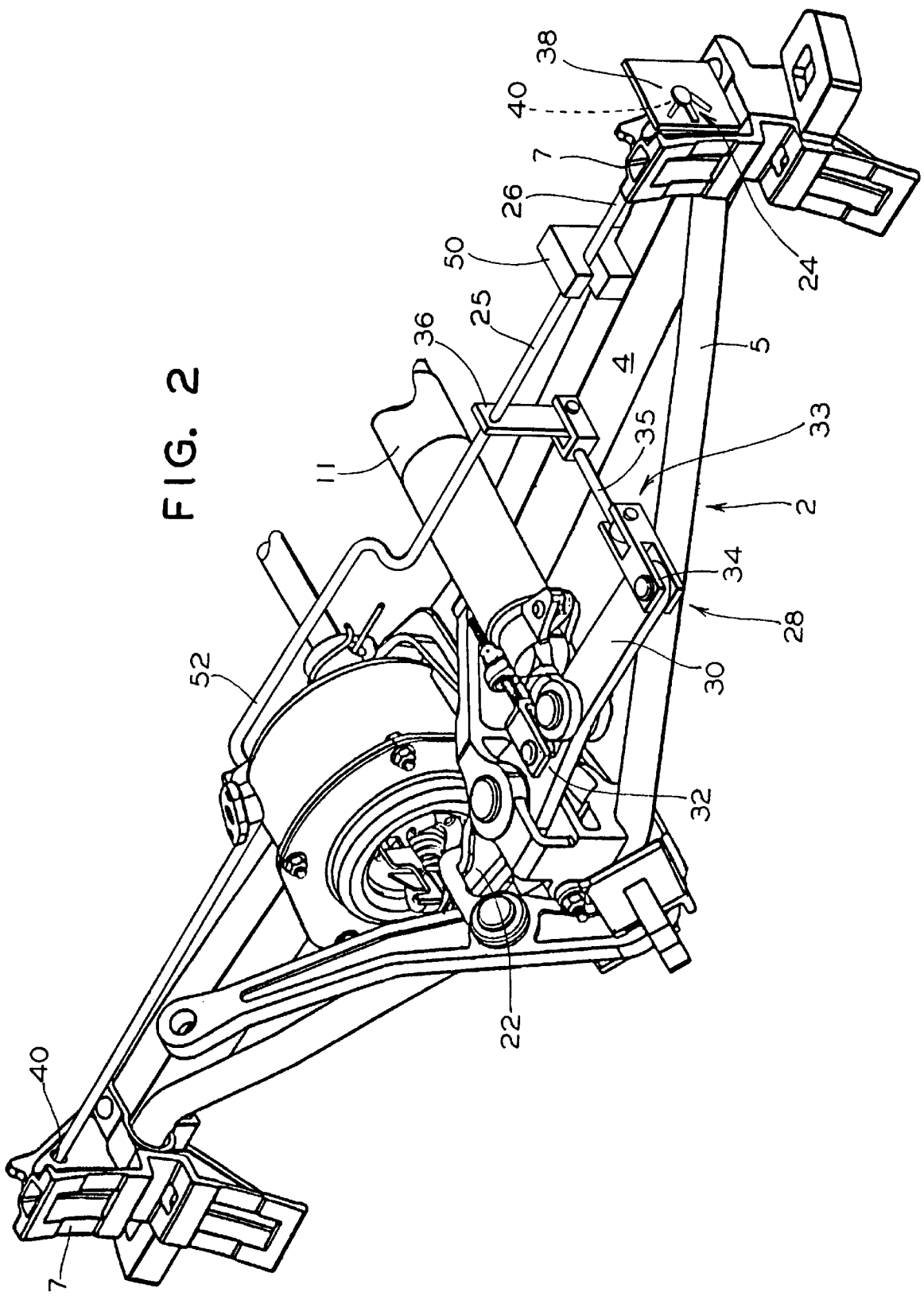
FIG. 2 shows a partial view of a truss-type brake assembly including the cylinder piston travel indicator of the invention mounted thereon.
Figure 3:
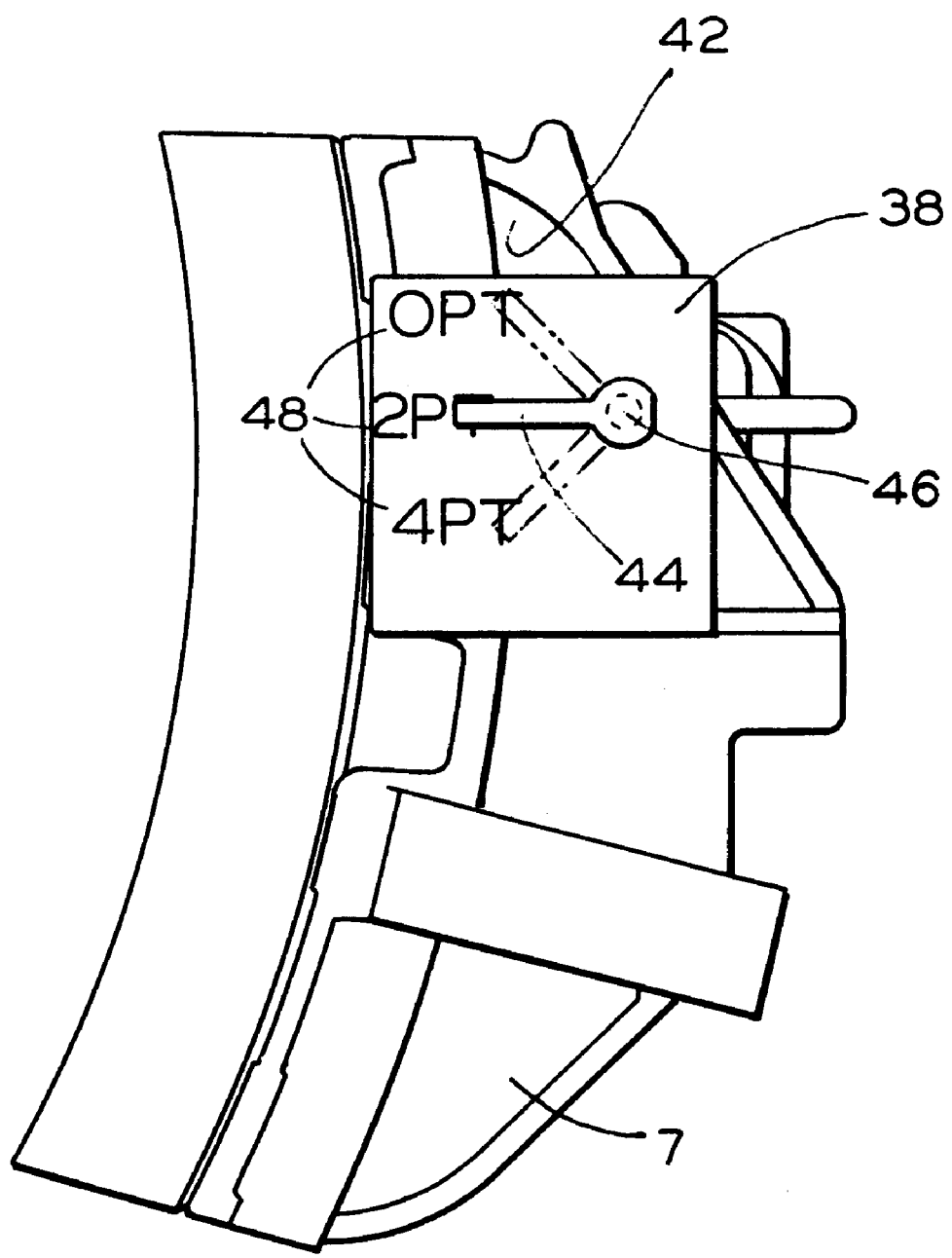
FIG. 3 shows an end view of the cylinder piston travel indicator of the invention.

Referring now to FIGS. 1–3, there is shown a truss type braking system, generally designated as 100. The brake system comprises a pair of brake beams 2, 3 formed by a compression member 4 and a tension member 5. The brake beams are interconnected by a series of well known linkages. In the type of braking system illustrated in FIG. 1, these linkages include a cylinder force transfer lever 8, a slack adjuster 11, a non-cylinder force transfer lever 9 and a return push rod 16. Each of the brake beams 2, 3, includes a brake head 7 mounted at each end thereof. A piston assembly 15 is also provided which is connected to the return push rod 16. The brake cylinder 15 has a piston 17 which is connected to a first end 22 of the cylinder force transfer lever 8.

As illustrated in FIG. 2, the invention comprises a brake cylinder piston travel indicator, generally indicated as 24, for monitoring the amount of piston travel during a brake application and positioning an indicator depicting this movement in a readily viewable location on the railway vehicle.

The brake cylinder piston travel indicator of the invention comprises a rod member 25 which is rotatably secured to and extends substantially parallel with at least a portion of at least one brake beam 2 of the braking system.

A means, generally designated as 28 is provided which associates or operationally interconnects the rod member 25 with the cylinder force transfer lever 8 and is capable of transferring a rotational force to the rod member 25. This rotational force is caused by activation of the piston 17 in the brake cylinder assembly 15 during a braking application.

At least one indicating means 38 is provided which is engagable with a first end 26 of the rod member 25 and is capable of responding to the rotation of the rod member 25 and indicating an amount of travel of the piston 17 during activation thereof in the brake cylinder assembly 15.

An aperture 40 is provided in at least one of the brake heads 7 and the first end 26 of rod member 25 extends through this aperture. The indicating means 38 is mounted on this first end 26 of the rod member 25 such that it is positioned adjacent an outer surface 42 of the brake head 7. Thus, this location of the indicating means 38 allows train personnel to readily view the indicating means 38.

Although not shown in FIG. 2, one having ordinary skill in the art would recognize that the rod member 25 of the cylinder piston travel indicator 24 can extend substantially the entire length of the at least one brake beam 2 in order to provide an indicating means 38 on either side of the railway vehicle. If such is the case, then an aperture would be formed in the brake head 7 positioned on the opposite side of the brake beam 2 and a second end of the rod member 25 would extend through this aperture. A second indicating means would be provided on the outer surface of this second brake head 7.

The rod member 25 is rotatably secured to the brake beam by any well known means such as a pillow block 50. More than one pillow block 50 may be used if necessary in order to sufficiently mount the rod member 25 to the brake beam 2. If the rod member extends the entire length of the brake beam, a U-shaped portion 52 may be provided so as to enable the rod to negotiate around the brake cylinder 15 of the braking system.

The means 28 for associating or operationally interconnecting the rod member 25 with the cylinder force transfer lever 8 includes an extension means 30 affixed to and extending outward from a second end 32 of the cylinder force transfer lever 8. This extension means 30 is positioned adjacent the slack adjuster 11. A linkage means, generally designated as 33, is provided which extends toward the compression member 4 of the brake beam 2 at approximately 90 degrees with respect to the extension means 30.

The linkage means 33 includes a jaw member 34 attached to the extension means 30. A turning lever 36 is provided which is rigidly attached to the rod member at one end. The opposite end of the turning lever 36 is pivotally attached to a pivotal attachment means 35. The pivotal attachment means 35 pivotally connects the jaw member 34 to the turning lever 36. The turning lever 36 extends in a substantially vertical direction with respect to the rod member 25 and the pivotal attachment means 35 such that movement of this turning lever 36 causes the rod member to rotate in a predetermined direction.

As illustrated in FIG. 3, at least one of the ends 26 of the rod member 25 is attached to an indicating means 38 which is located in a viewable location on the railway vehicle. The indicating means 38 includes a pointer 44 which is capable of turning about a fixed axis 46 with respect to a measuring means 48. In the illustrated embodiment, the measuring means includes a series of numbers is shown which denotes an amount of piston travel. This amount of piston travel can range from approximately 0–4 inches. Note that although a particular indicating means is illustrated in the Figures, any well known type of indicating means along with a well known type of measuring means may be used to measure the amount of piston travel.

The invention has been described in such full, clear, concise and exact terms so as to enable any person skilled in the art to which it pertains to make and use the same. It should be understood that variations, modifications, equivalents and substitutions for components of the specifically described embodiments of the invention may be made by those skilled in the art without departing from the spirit and scope of the invention as set forth in the appended claims. Persons who possess such skill will also recognize that the foregoing description is merely illustrative and not intended to limit any of the ensuing claims to any particular narrow interpretation.

We claim:

1. A brake cylinder piston travel indicator for monitoring an amount of piston travel in a brake cylinder assembly in a railway braking system, such railway braking system including a brake beam and a brake cylinder piston in engagement with a first end of a brake cylinder force transfer lever, said piston travel indicator comprising:
   (a) a rod member rotatably secured to and extending substantially parallel with at least a portion of such brake beam;
   (b) means for operationally interconnecting said rod member with such cylinder force transfer lever, said means capable of transferring a rotational force to said rod member, said rotational force being initiated by activation of such piston in such brake cylinder assembly; and
   (c) at least one indicating means engagable with a first end of said rod member, said indicating means capable of responding to said rotation of said rod member and indicating an amount of travel of such piston during activation thereof in such brake cylinder assembly.

2. A brake cylinder piston travel indicator as recited in claim 1 wherein said rod member extends parallel with and substantially along the length of such brake beam.

3. A brake cylinder piston travel indicator as recited in claim 1 wherein such brake beam includes a pair of brake heads at opposite ends thereof, at least one of said brake heads including an aperture and said first end of said rod member is capable of extending through such aperture.

4. A brake cylinder piston travel indicator as recited in claim 3 wherein said indicating means is engagable with said first end of said rod member such that said indicating means is positioned adjacent an outer surface of such at least one brake head.

5. A brake cylinder piston travel indicator as recited in claim 3 wherein each of such brake heads includes an aperture and a first end of said rod member extends through an aperture in a first brake head and a second end of said rod member extends through an aperture in a second brake head.

6. A brake cylinder piston travel indicator as recited in claim 5 wherein a first and second indicating means are provided, said first indicating means being engagable with said first end of said rod member and said second indicating means being engagable with said second end of said rod member.

7. A brake cylinder piston travel indicator as recited in claim 6 wherein said first and second indicating means are engagable with said first and second ends of said rod member such that said indicating means are capable of being positioned adjacent outer surfaces of such first and second brake heads.

8. A brake cylinder piston travel indicator as recited in claim 1 wherein said indicating means includes a pointer capable of turning about a fixed axis with respect to a measuring means.

9. A brake cylinder piston travel indicator as recited in claim 8 wherein said measuring means includes a series of numbers which denote an amount of piston travel.

10. A brake cylinder piston travel indicator as recited in claim 9 wherein said amount of piston travel measured includes a range of approximately 0–4 inches.

11. A brake cylinder piston travel indicator as recited in claim 1 wherein said means for operationally interconnecting said rod member with such cylinder force transfer lever includes an extension means affixed to and extending outward from a second end of such cylinder force transfer lever.

12. A brake cylinder piston travel indicator as recited in claim 11 wherein such braking system includes a slack adjuster connected to said second end of such cylinder force transfer lever and said extension means is adjacent such slack adjuster.

13. A brake cylinder piston travel indicator as recited in claim 11 wherein said means for operationally interconnecting said rod member with such cylinder force transfer lever further includes a linkage means extending toward such brake beam at approximately 90 degrees with respect to said extension means.

14. A brake cylinder piston travel indicator as recited in claim 13 wherein said linkage means includes a jaw member attached to said extension means, a turning lever attached to said rod member and a pivotal attachment means pivotally connecting said jaw member to said turning lever.

15. A brake cylinder piston travel indicator as recited in claim 14 wherein said turning lever extends in a substantially vertical direction with respect to said rod member and said pivotal attachment means such that movement of said turning member causes said rod member to rotate in a predetermined direction.

16. A brake cylinder piston travel indicator as recited in claim 1 wherein said rod member is rotatably secured to such brake beam by means of at least one pillow block.

17. A brake cylinder piston travel indicator as recited in claim 1 wherein said rod member includes a U-shaped portion positioned around such brake cylinder assembly.

18. In combination with a truss type braking system having a pair of brake beams interconnected by a series of linkages, each of said brake beams having a brake head mounted at each end thereof, a brake cylinder having a piston, and a brake cylinder force transfer lever having an end in engagement with said brake cylinder piston and wherein the improvement comprises a brake cylinder piston travel indicator comprising;

(a) a rod member rotatably secured to and extending substantially parallel with at least a portion of at least one of said brake beams;

(b) means for operationally interconnecting said rod member with said cylinder force transfer lever, said means capable of transferring a rotational force to said rod member, said rotational force being initiated by activation of said piston in said brake cylinder assembly; and (c) at least one indicating means engagable with a first end of said rod member, said indicating means capable of responding to said rotation of said rod member and indicating an amount of travel of said piston during activation thereof in said brake cylinder assembly.

19. A combination as recited in claim 18 wherein said brake cylinder piston travel indicator includes an indicating means mounted on each side of said at least one brake beam.

20. A combination as recited in claim 18 wherein said means for operationally interconnecting said rod member with said cylinder force transfer lever includes an extension means attached to an end of said force transfer lever at a location remote from said brake cylinder and a linkage means extending toward such brake beam at approximately 90 degrees with respect to said extension means, said linkage means including a jaw member attached to said extension means, a turning lever attached to said rod member and a pivotal attachment means pivotally connecting said jaw member to said turning lever, said turning lever extending in a substantially vertical direction with respect to said rod member and said pivotal attachment means such that movement of said turning member causes said rod member to rotate in a predetermined direction.

* * * * *